United States Patent Office 3,527,766
Patented Sept. 8, 1970

3,527,766
DERIVATIVE OF 6,11-DIHYDRO-DIBENZ-(b,e)THIEPIN
Miroslav Protiva, Miroslav Rajšner, Zdeněk Votava, and Jiřina Metyšová, Prague, Czechoslovakia, assignors to Spofa, Sdružení podniků pro zdravotnickou výrobu, Prague, Czechoslovakia
No Drawing. Filed June 4, 1962, Ser. No. 199,635
Claims priority, application Czechoslovakia, June 8, 1961, 3,564/61; Mar. 24, 1962, 1,826/62, 1,827/62
Int. Cl. C07d 67/00
U.S. Cl. 260—327    1 Claim The invention relates to the preparation of new 6,11-dihydrodibenz-(b,e)thiepin derivatives of the general Formula I

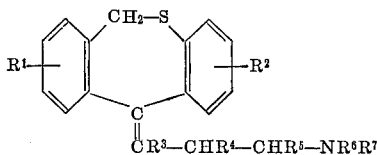

and salts thereof.

In the formula $R^1$ and $R^2$ (which may be the same or different and may be in any position in the aromatic nuclei) stand for a hydrogen atom, an alkyl-, alkoxyl-, aryl-, aralkyl, or alkylmercapto group, or a halogen atom, and $R^3$, $R^4$, and $R^5$ either for hydrogen atoms, in which case $R^6$ and $R^7$ stand for lower alkyl residues, which in the given case may form, linked together, an alkylene chain, interrupted as the case may be with an oxygen or nitrogen atom, which may be substituted with a lower alkyl residue, or two of the $R^3$, $R^4$ and $R^5$ substituents stand for hydrogen atoms, and the third one is linked with $R^6$ to form an unbranched alkylene chain with 2–4 carbon atoms, in which case $R^7$ stands for a lower alkyl residue.

The new derivatives of this invention exhibit a series of significant pharmacodynamical effects. They can serve as drugs, especially in some disorders and diseases of the central and vegetative nervous system. Among these affects may be mentioned the antidepressive, ataractic spasmolytic and antihistaminic effects of the compounds as particularly typical effects thereof.

The method of preparing the new compounds of the Formula I according to the invention is essentially characterized in that a compound of the general Formula II

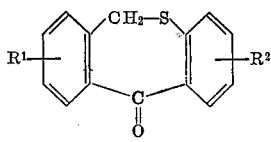

wherein $R^1$ and $R^2$ have the same definition as in the Formula I, is made to react with a Grignard reagent of the general Formula III $$R^6R^7NCHR^5\text{—}CHR^4\text{—}CHR^3\text{—}MgHal \qquad III$$

wherein $R^3$ to $R^7$ stand for the same as in Formula I, and Hal signifies a halogen atom, preferably chlorine, whereupon the compound thus obtained, having the general Formula IV

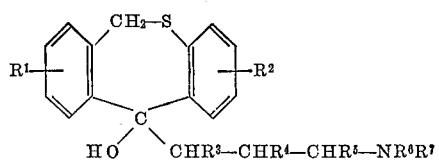

wherein $R^1$ to $R^7$ signify the same as in the Formula I, is dehydrated and the product obtained converted to a salt.

The compounds of the general Formula II serving as the starting material, i.e. the 11-oxo-6,11-dihydrodibenz-(b,e)thiepins, are available e.g. by cyclization of suitably substituted S-benzylthio salicyclic acid chloride or its anhydride in the presence of anhydrous aluminium chloride, or by cyclization of suitably substituted 2-(phenyl-mercaptomethyl)-benzoic acids with aid of polyphosphoric acid.

For the preparation of the Grignard reagent of the general Formula III there can expediently be used basic alkyl halides, respectively heterocyclic basic halides, such as 3-dimethylaminopropyl chloride, 3-piperidinopropyl chloride, 3-morpholinopropyl chloride, 3-pyrrolidinopropyl chloride, 3-(N'-methylpiperazino)-propyl chloride, 2-(N-methyl-2-piperidyl)-ethyl chloride, N - methyl - 3-piperidylmethyl chloride, N-methyl-4-piperidyl chloride, etc.

The compounds of the general Formula IV obtained by the Grignard reaction can be easily converted to the desired products of the general Formula I by the action of various dehydrating agents, such as dilute mineral acids, alcoholic or ethereal HCl-solution, acetyl chloride, thionyl chloride, iodine, etc. The compounds are viscous oily liquids or crystalline substances. In some instances they exist in the form of cis-trans isomers, which can be separated by careful crystallization of their salts.

Among various salts which can be obtained by neutralizing the free bases of the general Formula I with acids, the hydrochlorides are especially significant, being readily crystallizable and water-soluble, and therefore adaptable for working up to medicinal preparations.

By way of illustration and not limitation, the following examples are presented herewith:

EXAMPLE 1

A few drops of ethyl bromide are added to a mixture of 1.5 g. magnesium and 15 ml. anhydrous ether, and when the reaction is started a solution of 9 ml. 3-dimethylaminopropyl chloride in 15 ml. ether are added. The reaction mixture is heated under reflux to boil gently for 2 hours. Thereupon, while stirring, a solution of 6.5 g. 11-oxo-6,11-dihydrodibenz-(b,e)thiepin in 25 ml. benzene is dropwise introduced. The reaction mixture is stirred for 18 hours and boiled under reflux, and after cooling decomposed by the addition of 100 ml. 10% ammonium chloride solution. There is further added 100 ml. chloroform, the mixture is thoroughly shaken, the organic phase separated and the aqueous phase extracted with chloroform. The chloroform extracts are united, dried over potash and evaporated. The residue (9.0 g.) crystallizes through on standing. Upon recrystallization from benzene-petroleum ether mixture the 11-oxo-11-(dimethylaminopropyl) - 6,11 - dihydrodibenz-(b,e)thiepin thus obtained has a melting point of 130–131° C.

8.0 g. of the latter crude carbinol, dissolved in 70 ml. of 3 N $H_2SO_4$, are heated for 5 min. to boiling, treated with charcoal and filtered. The filtrate is made alkaline with a 20% NaOH solution, the base eliminated extraction with chloroform, the extract dried over potash and evaporated to dryness. The residue is then distilled under vacuum. There is obtained 4.3 g. 11-(3-dimethylaminopropylidene)-6,11-dihydrodibenz - (b,e)thiepin, having $B.P._{0.2}$ 162–164°C. By dissolving in ethanol and neutralizing with ethereal HCl solution the crystalline hydrochloride is obtained, which on recrystallization from an ethanol-ether mixture melts at 215–217° C.

EXAMPLE 2

Into a solution of 3-dimethylaminopropyl magnesium chloride prepared of 4.5 g. magnesium and 22.4 g. 3-dimethylaminopropyl chloride in 80 ml. ether is introduced dropwise during a short time period a solution, prepared of 22.1 g. 2 methyl-11-oxo 6,11-dihydrodibenz-(b,e)thiepin in 150 ml. of thiophene-free benzene. The reaction mixture is stirred for 16 hours in a water-bath maintained at 60% C., then cooled and decomposed by dripping into 200 ml. of a 10% ammonium chloride solution. The benzene-ether layer is separated, the aqueous layer extracted twice, each time with 50 ml. benzene, the organic extracts united, dried over potash, and the solvents evaporated at reduced pressure. The crystalline residue yields on crystallization from 120 ml. ethanol 18 g. 60% of the desired 2-methyl-11-(3-dimethylaminopropyl)-11-hydroxy - 6,11 - dihydrodibenz-(b,e)thiepin, melting at 142–143° C.

10 g. of the latter carbinol, dissolved in 100 ml. 3 N $H_2SO_4$ are heated for 20 minutes to boiling. After cooling the solution is made alkaline with concentrated ammonia, and the base thus eliminated extracted with benzene the extract dried over potash and evaporated at reduced pressure. The residue is dissolved in 11 ml. absolute ethanol, and by addiiton of ethereal HCl solution in slight excess the hydrochloride precipitated. In this way 8.4 g. (80%) of crystalline 2-methyl-11-(3-dimethylaminopropylidene)-6,11-dihydrodibenz-(b,e)thiepin hydrochloride, melting at 218–220° C., are obtained. By repeated recrystallization from ethanol-ether mixture there are obtained products melting consistently at 220° C. There is evidently the question of the one of the two possible geometric isomers.

The compound 2-methyl-11-oxo-6,11-dihydrodibenz (b,e) thiepin, which serves as the starting material, can be prepared in the following manner: Into polyphosphoric acid (obtanied from 157 g. phosphorus pentoxide and 105 ml. of 85% phosphoric acid) 49 g. 2(p-tolylmercaptomethyl)-benzoic acid is introduced in portions at 140° C. while stirring. The mixture is stirred for an additional 2 hours at the above-mentioned temperature, and after partial cooling poured into a great excess of ice-water mixture. The product eliminated is extracted with chloroform, the extract washed with 10% NaOH solution, dried over potash and evaporated. The crystalline residue is purified by recrystallization from ethanol. M.P. 119–121° C.; yield 35 g. (76.2%).

EXAMPLE 3

Analogously to Example 2, a Grignard reagent prepared of 8.7 g. 3-dimethylaminopropyl chloride is made to react with 8.6 g. of 4-methyl-11-oxo-6,11-dihydrodibenz(b,e) thiepin. This results in a good yield in the production of 4-methyl-11-(3 - dimethylaminopropyl)-11-hydroxy-6,11-dihydrodibenz(b,e)thiepin, having M.P. 164–166° C. (ethanol).

4.3 g. of the thus formed carbinol are heated to boiling with 55 ml. 3 N $H_2SO_4$ and boiled for 20 minutes. The clear solution obtained is worked up in the same manner as in Example 2. There is obtained 3.9 g. of 4-methyl-11-(3-dimethylaminopropylidene)-6,11-dihydridobenz(b,e)-thilepin hydrochloride, melting at 195–197° C. (ethanol-ether).

The starting compound 4-methyl-11-oxo-6,11-dihydrodibenz-(b,e)thiepin is obtained by cyclization of 2-(o-tolylmercaptomethyl)-benzoic acid at 110° C. with the aid of polyphosphoric acid. Yield is 84%, M.P. 109–111° C.

EXAMPLE 4

Analogously to Example 2, a Grignard reagent prepared of 16.3 g. 3-dimethylaminopropyl chloride is made to react with 17 g. 2-ethyl-11-oxo-6,11-dihydrodibenz(b,e) thiepin. There is thus obtained in good yield 2-ethyl-11-(3-dimethylaminopropyl)-11-hydroxy-6,11-dihydrodibenz (b,e)thiepin, melting at 138–139° C. (ethanol).

5.5 g. of this carbinol with 150 ml. 3 N $H_2SO_4$ is heated for 20 min. to boil. The solution obtained is worked up in the same manner as in Example 2. There is obtained 3.3 g. (57%) of the 2-ethyl-11-(3-dimethylaminopropylidene) - 6,11 - dihydrodibenz(b,e)-thiepin hydrochloride, melting at 200–201° C.

The starting compound 2-ethyl-11-oxo-6,11-dihydrodibenz-(b,e)thiepin is obtained by cyclization of 2-(p-ethyl-mercaptomethyl)-benzoic acid at 100° C. with the aid of polyphosphoric acid. Yield is 74%, M.P. 52–53° C. (cyclohexane).

EXAMPLE 5

Analogously to Example 2, a Grignard reagent prepared of 18.1 g. 3-dimethylaminopropyl chloride is made to react with 20 g. 2-isopropyl-11-oxo-6,11-dihydrodibenz (b,e)thiepin. This results in a 51% yield of the 2-isopropyl-11-(3-diamethylaminopropyl)-11-hydroxy-6,11-dihydrodibenz(b,e)thiepin, melting at 169–170° C. (benzene-petroleum ether).

7.0 g. of this carbinol with 150 ml. 3 N $H_2SO_4$ is heated for 25 min. to boiling. By working up the reaction mixture in the same manner as in Example 2, 5.3 g. of the 2-isopropyl-11-(3-dimethylaminopropylidene)-6,11-dihydrodibenz-(b,e)thiepin hydrochloride, M.P. 198–200° C. (ethanol-ether) is obtained.

The starting compound 2-isopropyl-11-oxo-6,11-dihydrodibenz-(b,e)thiepin (M.P. 94–95° C., ethanol) is prepared by cyclization of the 2-(p-isopropylphenylmercaptomethyl)-benzoic acid, analogously to the preceding examples.

EXAMPLE 6

Analogously, starting from the 2-(n-butyl)-11-oxo-6, 11-dihydrodibenz(b,e)thiepin (M.P. 58–60° C.) the 2-(n-butyl) - 11 - (3 - dimethylaminopropyl)-11-hydroxy-6, 11-dihydrodibenz(b,e)-thiepin (M.P. 122° C., ethanol) is obtained, from which, by dehydration the 2-(n-butyl)-11-(3-dimethylaminopropylidene) - 6,11 - dihydrodibenz (b,e)thiepin hydrochloride, M.P. 98–101° C. (ethanol-ether) is prepared.

EXAMPLE 7

A Grignard reagent prepared of 2.4 g. magnesium and 13.4 g. 3-dimethylaminopropyl chloride in 20 ml. anhydrous ether, is made to react with 15.8 g. of 2-benzyl-11-oxo-6,11-dihydrodibenz(b,e)-thiepin dissolved in anhydrous tetrahydrofurane. There is obtained 10 g. of the 2-benzyl-11-(3-dimethylaminopropyl) - 11 - hydroxy-6, 11-dihydrodibenz(b,e)thiepin (M.P. 122–123° C., ethanol), which upon the usual processing yields the crystalline and hygroscopic 2-benzyl - 11 - (3-dimethylaminopropylidene) - 6,11 - dihydrodibenz(b,e)-thiepin hydrochloride.

The starting compound 2-benzyl-11-oxo-6,11-dihydrodibenz-(b,e)thiepin (M.P. 155–156° C., benzene) is prepared by cyclization of the 2-(p-benzylmercaptomethyl)-benzoic acid.

EXAMPLE 8

A Grignard reagent prepared of 10.75 g. magnesium and 53.75 g. 3-dimethylaminopropyl chloride in 250 ml. anhydrous ether, is made to react with 53.0 g. 2-fluoro-11-oxo-6,11-dihydrodibenz(b,e)thiepin dissolved in 200 ml. of thiophene benzene. By the usual procedure 16.2 g. of 2-fluoro - 11 - (3-dimethylaminopropyl)-11-hydroxy-6, 11-dihydrodibenz-(b,e)thiepin, M.P. 155–156° C., is obtained.

A mixture consisting of 7.0 g. of the above carbinol, 50 ml. chloroform and 6.5 g. acetyl chloride is heated for 5 hours under reflux. It is then evaporated at reduced pressure, and the residue formed by the crude 2-fluoro-11 - (3 - dimethylaminopropylidene)-6,11-dihydrodibenz-(b,e)thiepin hydrochloride is purified by recrystallization from an ethanol-acetone-ether mixture. The yield of the purified product, M.P. 200–202° C., amounts to 4.2 g.

This product evidently represents a mixture of the two possible geometric isomers, since in extremely slow crystallization there can be observed development of two clearly different crystal types, which can be mechanically separated. The one form melts at 229–231° C., the other one at 190–194° C.

The compound 2-fluoro-11-oxo-6,11-dihydrodibenz-(b,e)thiepin (M.P. 101–104° C., ethanol) serving as the starting material is prepared by cyclization of 2-(p-fluorophenylmercaptomethyl)-benzoic acid.

In analogous way to the preceding examples additional compounds of the general Formula I can be prepared:

2-chloro - 11 - (3 - dimethylaminopropylidene)-6,11-dihydrodibenz-(b,e)-thiepin hydrochloride, M.P. 244–247° C. (ethanol). The corresponding ketone II melts at 136° C., and the carbinol IV at 152–153° C. (benzene).

9-chloro - 11 - (3-dimethylaminopropylidene)-6,11-dihydrodibenz-(b,e)-thiepin hydrochloride, M.P. 184–185° C. ethanol-ether. The corresponding ketone II melts at 89–90° C. (ethanol), and the carbinol IV at 144–145° C. (ethanol).

2,9-dichloro - 11 - (3-dimethylaminopropylidene)-6,11-dihydrodibenz(b,e)thiepin hydrochloride, M.P. 123–236° C. (ethanol-ether). The corresponding ketone II melts at 135–136° C. (ethanol), and the carbinol IV at 166–167° C. (ethanol).

2-bromo - 11 - (3-dimethylaminopropylidene)-6,11-dihydrodibenz(b,e)thiepin hydrochloride, M.P. 260–261° C. (ethanol). The corresponding ketone II melts at 151–156° C. (acetone-ethanol), and the carbinol IV melts at 164–165° C. (ethanol).

When in the preparation of the Grignard reagent of the general Formula III e.g. 3-piperidinopropyl-, 3-morpholinopropyl-, 3 - pyrrolidinopropyl-, 3-(N'-methylpiperazine)-propyl-, 2-(N - methyl - 2 - piperidyl)-ethyl-, N-methyl-3-piperidylmethyl-, or N-methyl-4-piperidyl chlorides are used, there are obtained by analogous reacting with the corresponding ketones of the general Formula II and the further usual procedure the following compounds of the general Formula I:

11-(3 - piperidinopropylidene) - 6,11 - dihydrodibenz-(b,e)thiepin hydrochloride, M.P. 260–262° C. (methanol);

11 - (3 - N' - methylpiperazinopropylidene)-6,11-dihydrodibenz(b,e)thiepin hydrochloride, M.P. 256–263° C. (ethanol-ether);

11-[2-(N - methyl - 2 - piperidyl)-ethylidene]-6,11-dihydrodibenz(b,e)thiepin hydrochloride, M.P. 198–201° C. (ethanol-ether);

11-(N - methyl - 3 - piperidylmethylene)-6,11-dihydrodibenz-(b,e)thiepin hydrochloride, M.P. 191–194° C. (ethanol-ether);

11-(N-methyl-4-piperidylidene) - 6,11 - dihydrodibenz (b,e)thiepin hydrochloride, M.P. 267–272° C. (ethanol-ether).

What we claim is:

1. 11-(3-dimethylaminopropylidene) - 6,11 - dihydrodibenz-(b,e)thiepin.

References Cited

UNITED STATES PATENTS

| 3,067,209 | 12/1962 | Doebel et al. | 260—328 |
| 3,115,502 | 12/1963 | Schlapfer | 260—328 |
| 2,951,082 | 8/1960 | Sprague et al. | 260—328 |

FOREIGN PATENTS

| 607,503 | 2/1962 | Belgium. |

OTHER REFERENCES

Stach et al., Agnew Chemie, International ed., vol. 1 (January 1962, pp. 50–1).

Derwent Belgian Patents, vol. 87A (Feb. 28, 1962), pp. 2–3 of Pharmaceutical and Photographic.

JAMES A. PATTEN, Primary Examiner

U.S. Cl. X.R.

260—240, 247.1, 268, 293.4, 326.5, 999